United States Patent [19]

Farrell et al.

[11] Patent Number: 5,657,424
[45] Date of Patent: Aug. 12, 1997

[54] ISOLATED WORD RECOGNITION USING DECISION TREE CLASSIFIERS AND TIME-INDEXED FEATURE VECTORS

[75] Inventors: Kevin R. Farrell, Milford; Jeffrey S. Sorensen, Seymour, both of Conn.

[73] Assignee: Dictaphone Corporation, Stratford, Conn.

[21] Appl. No.: 550,920

[22] Filed: Oct. 31, 1995

[51] Int. Cl.[6] .................................................. G10L 5/06
[52] U.S. Cl. ...................... 395/2.64; 395/2.41; 395/2.43; 395/2.45; 395/2.47; 395/2.49
[58] Field of Search ................................. 395/2.41, 2.43, 395/2.45–2.47, 2.53, 2.54, 2.6, 2.65

[56] References Cited

U.S. PATENT DOCUMENTS

| | | | |
|---|---|---|---|
| 4,277,644 | 7/1981 | Levinson et al. | 179/1 SD |
| 4,394,538 | 7/1983 | Warren et al. | 179/1 SD |
| 4,555,796 | 11/1985 | Sakoe | 381/43 |
| 4,559,604 | 12/1985 | Ichikawa et al. | 364/513.5 |
| 4,813,076 | 3/1989 | Miller | 381/43 |
| 4,819,271 | 4/1989 | Bahl et al. | 381/43 |
| 4,852,173 | 7/1989 | Bahl et al. | 381/43 |
| 4,985,924 | 1/1991 | Matsuura | 381/43 |
| 5,033,087 | 7/1991 | Bahl et al. | 381/43 |
| 5,033,089 | 7/1991 | Fujimoto et al. | 381/43 |
| 5,345,536 | 9/1994 | Hoshimi et al. | 395/2.52 |
| 5,481,644 | 1/1996 | Inazumi | 395/2.41 |
| 5,596,679 | 1/1997 | Wang | 395/2.45 |

OTHER PUBLICATIONS

Milner, B. "Inclusion of Temporal Information into features for Speech Recognition." Fourth International Conference on spoken Language Processing. Oct. 1996.

Lawrence R. Rabiner, "A Tutorial on Hidden Markov Models and Seleced Applications in Speech Recognition," *Proceedings of the IEEE*, vol. 77, No. 2, Feb. 1989, pp. 257–286.

K. Fukunaga, *Introduction to Statistical Pattern Recognition*, 1990, pp. 50–57, 124–125.

L. Breiman, et al., *Classification and Regression Trees*, 1984, pp. 18–27.

K.R. Farrell, et al., "Speaker Recognition Using Neural Networks and Conventional Classifiers," *IEEE Transactions on Speech and Audio Processing*, vol. 2, No. 1, part II, Jan. 1994, pp. 194–205.

K.R. Farrell, et al., "Speech Recognition Using Time–Indexed Feature Vectors and Discriminant–Trained Classifiers," disclosed at IEEE 1995 Workshop on Speech Recognition, Snowbird, Utah, Jul., 1995.

K.R. Farrell, et al., "Speech Recognition Using Time–Indexed Feature Vectors and Discriminant–Trained Classifiers," disclosed at IEEE ICASSP, Atlanta, Georgia, Aug., 1995.

*Primary Examiner*—Allen R. MacDonald
*Assistant Examiner*—Alphonso A. Collins
*Attorney, Agent, or Firm*—Robin, Blecker, Daley & Driscoll

[57] ABSTRACT

Machine recognition of isolated word utterances is carried out by applying time-indexed feature vectors to binary decision tree classifiers. A respective classifier is provided for each target word in the vocabulary of words to be recognized. Determinants for the nodes in the classifier tree structure are formed, during a training process, as hyperplanes which perform a "mean split" between the centroids of target word and non-target word classes of feature vectors assigned to the respective nodes. The process of training the machine recognition system is facilitated by storing node-assignment data in association with training data vectors. The assignment of training data vectors to sub-nodes proceeds on a level-by-level basis in the tree structure.

15 Claims, 3 Drawing Sheets

ISOLATED WORD RECOGNITION USING DECISION TREE CLASSIFIERS AND TIME-INDEXED FEATURE VECTORS

FIELD OF THE INVENTION

This invention relates to pattern classification, and, more particularly to a method and apparatus for classifying unknown speech utterances into specific word categories.

BACKGROUND OF THE INVENTION

Many techniques have been proposed for performing machine recognition of the content of spoken words. One highly regarded technique is described in an article by Lawrence R. Rabiner, entitled "A Tutorial on Hidden Markov Models and Selected Applications in Speech Recognition", *Proceedings of the IEEE*, vol. 77, no. 2, February, 1989, pp. 257–286. According to this technique, spoken utterances, comprising either continuous speech or isolated words or phrases, are modeled in terms of state transitions by statistical models known as hidden Markov models. Although this technique has provided promising results in terms of accuracy of recognition, the models must be quite complex if satisfactory performance is to be achieved, so that a large number of calculations must be performed during recognition operations. In addition, the required calculations often cannot be satisfactorily performed using fixed point processing. Because fixed point processors are relatively low in cost, and are commonly used in many types of office equipment, it would be desirable to provide a speech recognition technique that can be performed satisfactorily with a fixed point processor while achieving a degree of accuracy that is comparable to that provided by hidden Markov model techniques.

OBJECTS AND SUMMARY OF THE INVENTION

It is an object of the invention to provide a method and apparatus for recognizing isolated word utterances with a high degree of accuracy.

It is a further object of the invention to provide an isolated word recognition technique in which a relatively small amount of computation is required.

It is still a further object of the invention to provide an isolated word recognition technique that can be satisfactorily carried out with a fixed point processor.

According to an aspect of the invention, there is provided a method of automatically recognizing isolated utterances, including the steps of receiving an utterance to be recognized, converting the received utterance into a sequence of digital signal samples, forming from the sequence of digital signal samples a sequence of feature vectors each of which represents characteristics of the received utterance during a respective temporal portion of the utterance, augmenting each of the feature vectors with a time index representative of a position of the respective feature vector in the sequence of feature vectors, and classifying the augmented feature vectors by use of a pattern classifier algorithm. Further in accordance with this aspect of the invention, the classifying step may include classifying the augmented feature vectors by use of each of a plurality of decision tree classifier algorithms, each one of which corresponds to a respective one of a plurality of target words to be recognized.

Further, each of the plurality of decision tree classifier algorithms may assign a respective numerical score to each of the augmented feature vectors, and the method may further include aggregating, with respect to each of the decision tree classifier algorithms, the numerical scores assigned to the augmented feature vectors by means of the respective algorithm, and classifying the received utterance as the target word which corresponds to the decision tree classifier algorithm which produced the largest of the aggregated numerical scores.

According to another aspect of the invention, there is provided a method of automatically recognizing isolated utterances, including the steps of receiving an utterance to be recognized, converting the received utterance into a sequence of digital signal samples, forming from the sequence of digital signal samples a sequence of feature vectors each of which represents characteristics of the received utterance during a respective temporal portion of the utterance, and classifying the feature vectors by use of each of a plurality of decision tree classifier algorithms, each corresponding to a respective one of a plurality of target words to be recognized.

According to still another aspect of the invention, there is provided a method of training a processing device to perform a decision tree classifier algorithm, including the steps of supplying a plurality of data vectors to the processing device, each of the data vectors consisting of n elements, n being a positive integer; inputting to the processing device, with each of the data vectors, a respective binary label indicative of whether or not the data vector is representative of a target class of data vectors to be recognized by the classifier algorithm; calculating a first centroid vector as the average of the data vectors representative of the target class; calculating a second centroid vector as the average of the data vectors not representative of the target class; assigning to a right-side child node all of the data vectors that are closer in n-dimensional space to the first centroid vector than to the second centroid vector; assigning to a left-side child node all of the data vectors that are not assigned to the right-side child node, and applying the following steps recursively with respect to each of the nodes: determining whether the node satisfies a termination criterion and, if the node is not determined to satisfy the termination criterion, calculating a first node centroid vector as the average of the data vectors assigned to the node and representative of the target class, calculating a second node centroid vector as the average of the data vectors assigned to the node and not representative of the target class, assigning to a right-side sub-node all of the data vectors assigned to the node that are closer in n-dimensional space to the first node centroid vector than to the second node centroid vector, and assigning to a left-side sub-node all of the data vectors not assigned to the right-side sub-node. Further in accordance with this aspect of the invention, a node may be determined to satisfy a termination criterion if all data vectors assigned to the node are representative of the target class, or if all data vectors assigned to the node are not representative of the target class, or if the node is at a predetermined level of a tree structure defined for the classifier algorithm.

According to still a further aspect of the invention, there is provided a method of training a processing device to perform a decision tree classifier algorithm, the training being carried out using a set of training data vectors stored in a memory, the algorithm being defined in terms of a tree structure comprising a plurality of non-terminal nodes and a plurality of terminal nodes, and each of the non-terminal nodes having a plurality of child nodes associated therewith, the method including the steps of assigning a respective plurality of the training data vectors to each one of the non-terminal nodes, sub-assigning each of the respective plurality of training data vectors among the child nodes associated with the non-terminal node to which the respective plurality of vectors was assigned, and, in association with each one of the respective plurality of training data vectors, storing in the memory sub-assignment data indicative of the child node to which the training data vector was sub-assigned.

Further in accordance with the latter aspect of the invention, the decision tree algorithm may be defined as a binary tree, i.e., a tree structure in which every non-terminal node has exactly two child nodes associated therewith. The tree structure preferably has at least three levels of nodes, with the first level consisting of a root node which is not the child node of any other node, a second level consisting of the two child nodes of the root node, and a third level consisting of the child nodes of the second-level nodes. Furthermore, assignment of data vectors to all of the nodes in a given level is completed before any of the data vectors are assigned to nodes at the next level.

DETAILED DESCRIPTION OF PREFERRED EMBODIMENTS

It is a key finding of the present invention that isolated word recognition can be performed with a high degree of accuracy by applying relatively simple decision tree classifier algorithms to speech feature vectors to which time indices have been added. Applicants have found that when temporal information is embedded in the speech data (i.e., when a dimension corresponding to elapsed time is included in the feature vector space), a straight-forward decision tree classification algorithm performs at a level of accuracy which is comparable to much more complicated models in which temporal information is incorporated into the model. Key advantages provided by the inventive concept are significant reductions in programming and computational complexity. This facilities performance of isolated word recognition at a high performance level using a relatively low-cost fixed-point platform.

System Overview

Figure 1:
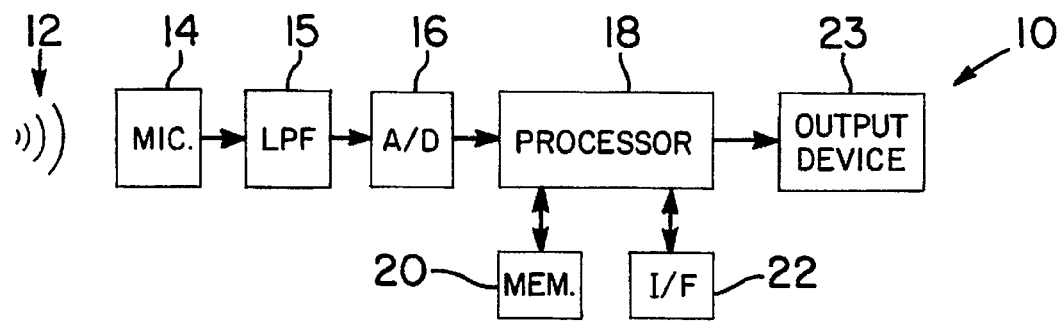
FIG. 1 is a block diagram of a speech recognition processing system in which the present invention is applied.

A hardware environment in which the invention may be applied will now be described with reference to FIG. 1. In FIG. 1, reference numeral 10 generally indicates a speech recognition system. In the system 10, spoken utterances 12 are received at a microphone 14 and the analog speech signal produced by the microphone is amplified by an amplifier (not separately shown). The resulting amplified analog speech signal is low-pass filtered at block 15 to avoid aliasing and then converted into digital signal samples at an analog-to-digital converter 16, and the digital signal samples are provided to a processor 18. The processor 18 may be, for example, a relatively low-cost fixed point digital signal processing device such as the TMS320C50 (available from Texas Instruments). It is also contemplated to use other types of digital signal processing devices, including floating-point devices, or general purpose processors such as the Intel 80486.

Associated with the processor 18 are program and working memory 20 and user interface devices 22. Although the memory 20 is shown as being separate from the processor 18, it should be understood that at least a portion of the memory 20 may be provided on-board the processor 18. The interface devices 22 may include, for example, conventional items such as a display screen, keyboard and mouse, or may consist of an additional system that provides user interface capabilities.

On the basis of novel word recognition processing carried out by the processor 18 with respect to the digital signal samples provided to the processor, the processor outputs a data signal indicative of a word recognition classification. This output signal is provided to an output device 23 which may, for example, utilize the output signal from the processor 18 to perform tasks such as hands-free telephone dialing, machine control, or display of text corresponding to the recognized word. It will be understood that, at least in the case of text display, the output device 23 may be physically integrated with the user interface devices 22.

It is contemplated that all of the hardware elements shown in FIG. 1 may be of conventional types, the novelty of the system 10 residing in the nature of the speech recognition signal processing which is performed by the processor 18 under control of a suitable program stored in the memory 20. Alternatively, it is contemplated that at least some of the digital signal processing functions to be described herein may be performed using suitable application-specific integrated circuits.

"Training" Procedures

Before the speech recognition system 10 is used to classify and recognize unknown utterances, an initialization or training operation must be carried out to derive decision rules that will be used to implement decision tree classifier algorithms to be used in accordance with the invention. An overview of the training process will now be described, initially with reference to FIG. 2.

A set of isolated word utterances, in the form of acoustic speech, are provided to the microphone 14 and converted into digital signal samples at the A/D converter 16. The digital signal samples, together with suitable labelling data which includes a unique index for each class of utterances, are provided to the processor 18. The data samples representing the test utterances are formed into data blocks which represent respective time periods (sometimes referred to as "frames") of the utterance. Each block of signal samples is subjected to feature extraction processing (block 24) which converts the block of audio data into a set of feature vectors which represents spectral characteristics of the utterance in the respective frame. In addition, a data element indicative of the position in time of the respective frame within the entire utterance is formed (block 26), and this data element is provided as an additional element to form an augmented feature vector which indicates both spectral characteristics and the position in time of the frame within the sequence of frames which make up the utterance (block 28). The blocks 24, 26 and 28 may be considered to constitute a single function which forms the training data into time-index augmented feature vectors (dotted line block 30). On the basis of the augmented feature vectors provided at block 30, and label data which identifies the utterance from which the feature vectors were produced, decision rules for the decision tree classifier algorithm are formed (block 32) and parameters representative of the decision rules are stored in the memory 20 (block 34).

Figure 2:
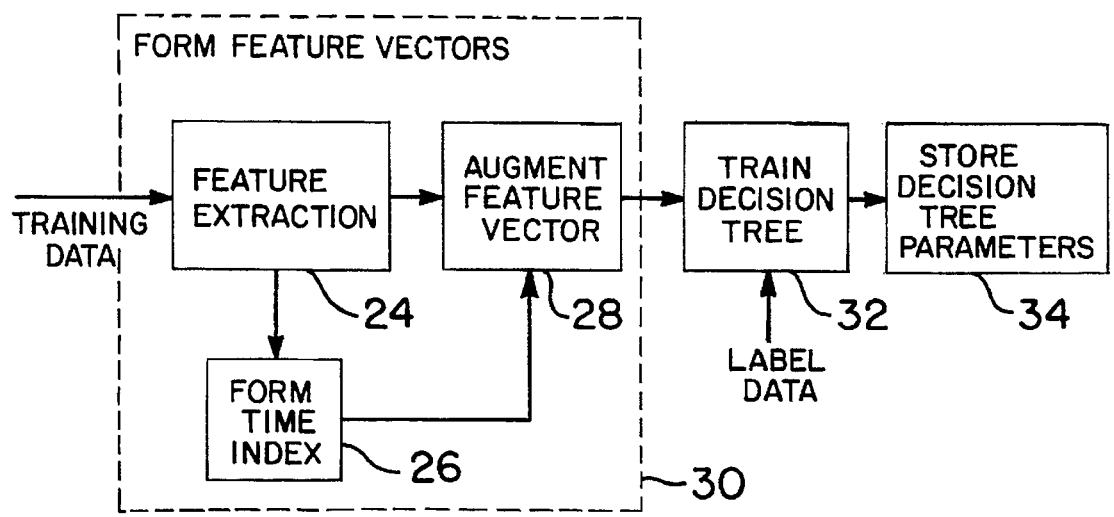
FIG. 2 is a functional block diagram which illustrates processing steps by which the speech recognition system of FIG. 1 is trained, in accordance with the invention, to perform isolated word speech recognition using a decision tree classifier algorithm.

More details of the training procedure of FIG. 2 will now be provided.

Figure 3:
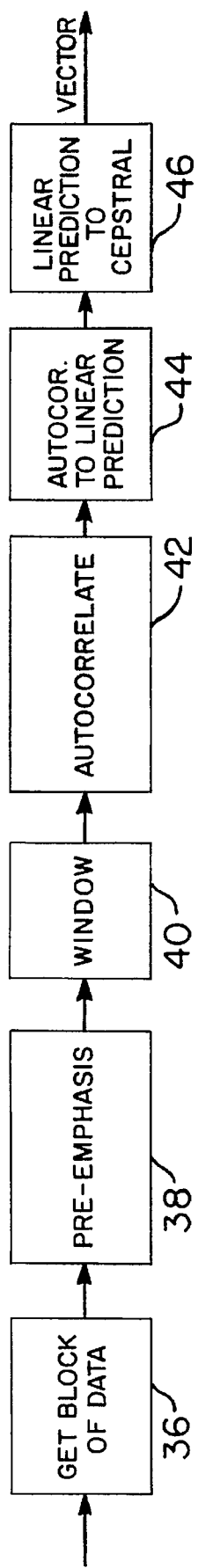
FIG. 3 is a functional block diagram which illustrates a feature extraction function which is part of the processing illustrated in FIG. 2.

It is contemplated that the feature extraction function (block 24) may be performed in accordance with any one of a number of conventional techniques. Some conventional feature extraction techniques are described at pages 194 and 195 of an article authored by Kevin R. Farrell (one of the applicants of the present application), Richard J. Mammone and Khaled T. Assaleh, entitled "Speaker Recognition Using Neural Networks and Conventional Classifiers," which appeared in *IEEE Transactions on Speech and Audio Processing*, vol. 2, no. 1, part II, January, 1994 (pages 194-205). A particular feature extraction technique is described at page 277 of the above-referenced article by Rabiner. In a preferred embodiment of the invention, a feature extraction procedure like that described in the Rabiner article is used. This preferred procedure will now be briefly described with reference to FIG. 3. As shown in FIG. 3, a block of data samples, representing a time interval of the training utterance, is obtained (block 36). The represented time interval may be on the order of 25 milliseconds (frame length), consisting of, say, 250 consecutive data samples in the case of a 10 KHz sampling frequency. The frame length may be greater or less than 25 milliseconds; frame lengths of from 10 to 30 milliseconds are contemplated, for example. The number of samples making up a block, may, correspondingly, be more or less than 250 samples, it being recognized that the number of samples used will depend both on the frame length of the feature interval and on the sampling rate. The sampling rate carried out at the A/D converter 16 may, for example, be on the order of 10 KHz, and rates such as 8 KHz or 16 KHz are also contemplated. In any case, it should be understood that blocks of fixed length are to be used throughout the training procedure and that the standard block length is also to be used in subsequent utterance recognition operations.

Continuing to refer to FIG. 3, each block of data is subjected to pre-emphasis processing, such as digital high-pass filtering (block 38), and the pre-emphasized data block is then windowed (block 40), using a Hamming window, for example. Auto correlation analysis (block 42) is performed on the windowed data block, and then a transformation of the resulting auto correlation coefficients to a set of linear predictive coding coefficients is carried out (step 44). Finally, a vector of cepstral coefficients is computed with respect to the LPC coefficients to provide a feature vector consisting of 12 elements (block 46). As will be understood by those who are skilled in the art, the feature extraction procedure of FIG. 3 may be carried out so as to provide a feature vector of larger or smaller order than 12. The vector of cepstral coefficients can optionally be appended with a vector of first and second cepstral derivatives as deemed appropriate. Alternatively, or in addition, a vector element representing the normalized log energy of the frame can be appended to the vector. Additionally, mean substraction and variance normalization may be desirable for many applications. Suitable parameters for performing the processes making up the feature extraction procedure can readily be determined by those of ordinary skill in the art. Satisfactory results have been obtained by applicants using a digital filter for pre-emphasis having the transfer function $1-0.95\ z^{-1}$. A 50% overlap with the samples of the preceding frame (corresponding to a 50% time overlap) was used.

Referring again to FIG. 2, the time index for the i'th frame in the utterance may be calculated as i/M, where M is the total number of frames in the utterance, with $0 \leq i \leq M-1$. Alternatively, the frame number (i) itself may be used. In either case, the feature vector formed at block 24, made up of 12 data elements (cepstral coefficients) in the example described above, is augmented with a 13th element which is the time index formed at block 26, and the augmented feature vector, together with all the other augmented feature vectors for the same utterance, and augmented feature vectors for all other training utterances, is processed to form the decision rules to be used in the decision tree classifier algorithm that will be applied to unknown utterances to be recognized.

According to one application for the invention, it may be desired to recognize utterances of the digits—"zero", "one", "two" . . . "nine". In this example, the training data would consist of plural examples of each of the spoken digits and, according to a preferred embodiment of the invention, a respective decision tree classifier would be formed for each one of the ten words to be recognized. The same set of augmented feature vectors representative of all of the training utterances would be used to train each of the ten decision trees, but label data used to identify the feature vectors as either representative of the word to be recognized by the particular decision tree being trained, or not representative of such word, would vary. Specifically, in forming the decision tree algorithm to be used for recognizing the word "zero", all of the augmented feature vectors derived from training utterances of "zero" would be assigned the label "1" to indicate that such augmented feature vectors are representative of the target word, while the augmented feature vectors for each of the other words "one", "two" . . . "nine" would be assigned the label "0" to indicate that such feature vectors are not representative of the target word.

On the other hand, in forming the decision tree algorithm for recognizing the word "one" only the augmented feature vectors formed from the training utterances of "one" would be assigned the label "1", and all of the other augmented feature vectors would be assigned the label "0".

Figure 5A:
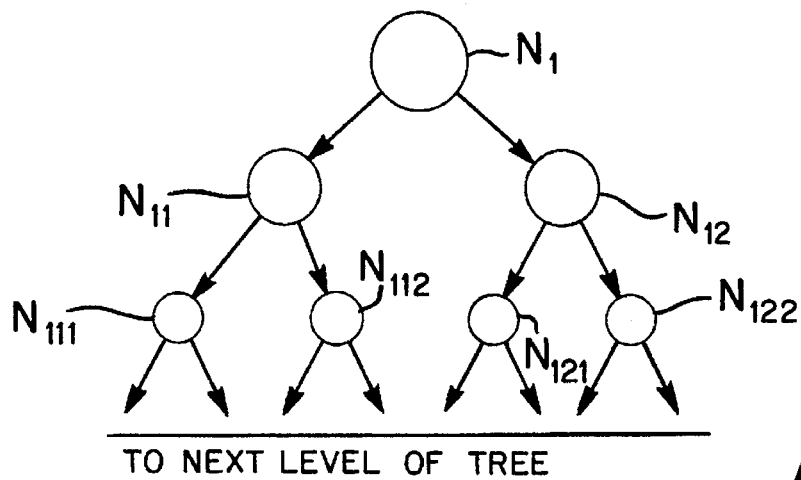
FIG. 5A is a generalized illustration of a decision tree structure of the type used in classifier algorithms in accordance with the invention.

FIG. 5A represents in schematic terms an example of a tree structure for the decision tree algorithms to be formed for each of the target words. It will be observed in FIG. 5A that the tree structure is made up of several levels, including a first level that includes only a single node $N_1$, a second level made up of nodes $N_{11}$ and $N_{12}$ (which are considered "child" nodes or "sub-nodes" with respect to the first level node $N_1$, which may be considered a "root" node) and a third level formed of child nodes $N_{111}$ and $N_{112}$ associated with second level node $N_{11}$ and nodes $N_{121}$ and $N_{122}$ which are child nodes associated with second level node $N_{12}$. As indicated in FIG. 5A, further levels of the tree structure are preferably also included, on the same pattern as that shown in FIG. 5A, i.e., with two child nodes associated with each node. Although a decision tree of more than three levels is preferred, it is not intended that the number of levels go on indefinitely. An explanation of how and at what level the tree is terminated will be provided below.

Figure 5B:
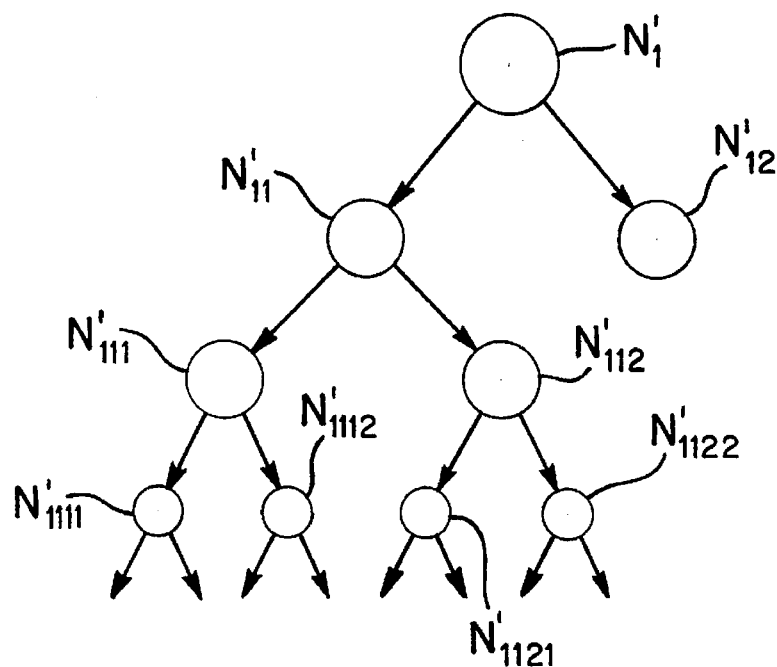
FIG. 5B is a particular example of a decision tree structure, corresponding to the data segmentation example illustrated in FIG. 4.

It will be understood that certain nodes, referred to as terminal nodes or "leaves", have no child nodes associated therewith (no "leaf" nodes are shown in FIG. 5A; see nodes $N'_{1111}$ and $N'_{12}$ of FIG. 5B as examples of leaf nodes). Nodes other than leaf nodes are referred to as non-terminal nodes. The preferred tree structure is "binary", meaning that each non-terminal node has two child nodes, representing a binary split of the data assigned for classification of the non-terminal node. However, it is also contemplated to use a non-binary tree structure whereby data assigned to each non-terminal node is split three or more ways.

Each of the non-terminal nodes is representative of a decision rule (also known as a "determinant") which is to be used in classifying feature vectors generated from unknown utterances that are to be recognized. With respect to each non-terminal node, the determinant for that node is used to divide all of the data vectors under consideration at (i.e., "assigned to") that node so that each data vector is assigned to one or the other of the child nodes of the node in question. It is a purpose of the training procedure of FIG. 2 to define for each node the determinant to be applied at the node.

Decision trees characterized by various types of determinant have been proposed, and it is within the contemplation of the invention to apply any type of determinant to the time-index-augmented feature vectors discussed above. Nevertheless, in the interest of computational efficiency, a preferred embodiment of the invention utilizes determinants that take the form of hyper-planes in the n-dimensional vector space of the augmented feature vectors (in the specific example given above, hyper-planes in 13-dimensional space). It is therefore necessary to define for each non-terminal node in each of the target-word decision trees the location and orientation of the hyper-plane which constitutes the determinant for that node. A computationally-efficient and effectively performing kind of determinant, employed in a preferred embodiment of the invention, constitutes a "mean" split implemented by the following equation:

$$(M_1-M_0)^T X + 0.5 * (M_0^T M_0 - M_1^T M_1) > 0, \quad (1)$$

where $M_0$ is the average (mean) of the training data augmented feature vectors which have the label "0" (i.e., do not represent a training utterance that is the target word for the decision tree in question), and $M_1$ is the average (mean) of the training data augmented feature vectors which have the label "1" (i.e., which represent the target word). Further, T denotes a matrix transposition operation and X is a feature vector that is to be assigned to one or the other of the sub-nodes on the basis of the decision rule.

When the value of feature vector X is such that the inequality (1) is satisfied, then the vector X is assigned to the right-side child node, and otherwise it is assigned to the left-side child node. It will be recognized that the decision rule embodied in inequality (1) is equivalent to assigning to one child node all feature vectors that are closer in 13-dimensional space to $M_1$ than to $M_0$, while assigning all other feature vectors to the other child node.

During the training process, the mean vectors $M_0$ and $M_1$ are calculated first for the root node and the resulting decision rule is then applied so that each of the training data augmented feature vectors is assigned either to the left-side or right-side sub-nodes of the root node. The procedure is then applied recursively to each of the nodes until the resulting sub-node satisfies one of the termination criteria which are described in the following paragraph.

A sub-node is considered a terminal node, and the recursive splitting of data is not carried out with respect to that sub-node, in cases where only data vectors of one class have been assigned to the sub-node. In other words, if all of the data vectors assigned to a sub-node represent the target word, or all of the assigned vectors do not represent the target word, then the data is not split, and the sub-node becomes a terminal node or "leaf". Further, in order to avoid "overtraining", an approach known as "forward pruning" is applied so that the tree structure is not permitted to grow beyond a predetermined level (see page 199 of the above-referenced article by Farrell, et al.). The appropriate level for limiting the tree structure depends on the particular application, and can be determined by those of ordinary skill in the art without undue experimentation. As an example, for isolated digit recognition, an eight level tree is found to give the best performance.

There is established for each terminal node a parameter which can be considered a "confidence factor". In the case of a terminal node which has assigned to it only training data feature vectors representative of the target word, the confidence factor is 1. Conversely, if all of the training data feature vectors assigned to the terminal node are not representative of the target word, then the confidence factor assigned to that terminal node is 0. Where the feature vectors assigned to the terminal node are mixed, i.e., of both classes, the confidence factor is calculated as the total number of vectors representing the target word divided by the total number of vectors of both classes assigned to the terminal node.

Figure 4:
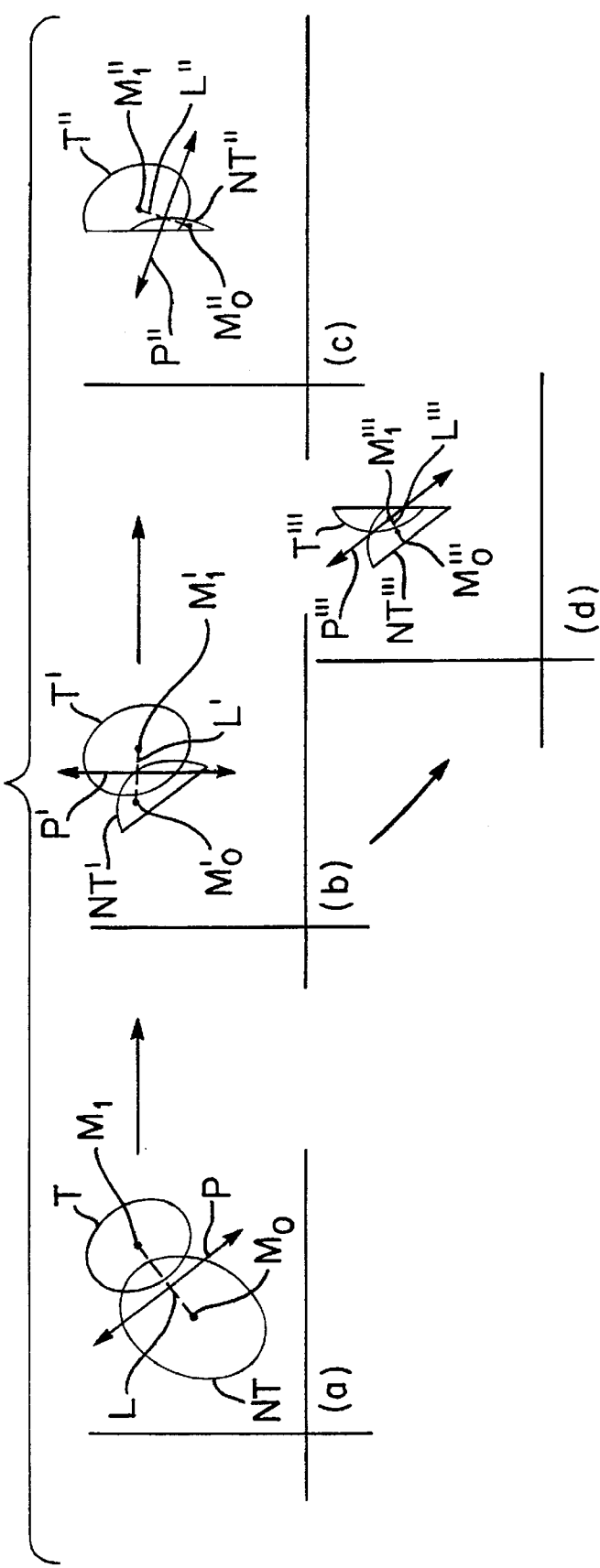
FIG. 4 is a simplified and pictorial illustration of a data segmentation procedure recursively carried out as part of the training process illustrated in FIG. 2.

FIG. 4 is a somewhat simplified two-dimensional pictorial representation of the procedure by which the "mean" split (inequality (1)) is used to define the position and orientation of the determinants for each node. In part (a) of FIG. 4, the oval area T represents a region in which all of the data vectors representative of the target word are found, while all of the other vectors are found in a space represented by the oval NT. The average vector $M_1$ is a centroid with respect to the target word vectors in area T, and the average vector $M_0$ is the centroid of the non-target vectors in the area NT. The inequality (1) operates to define a determinant plane P which bisects, and is orthogonal to, a line segment L defined between $M_0$ and $M_1$. In the particular example shown in part (a) of FIG. 4, the plane P is the determinant for the root node $N'_1$ of FIG. 5B, and results in mixed data being assigned to the child node $N'_{11}$, but "pure" data corresponding to non-target words is assigned to the other sub-node $N'_{12}$, which therefore becomes a terminal node having the confidence factor 0.

Formation of the determinant for the node $N'_{11}$ is illustrated in part (b) of FIG. 4. As in the process illustrated in part (a), in part (b) a determinant plane P' is established in a position and orientation that bisects and is orthogonal to a line segment connecting the respective centroids $M'_1$ and $M'_0$ of the target word data vectors and the non-target word data vectors assigned to the node $N'_{11}$.

It will be seen that neither of the child nodes $N'_{111}$ and $N'_{112}$ of the node $N'_{11}$ is a terminal node, since some data vectors of both classes are assigned to both of the nodes. Accordingly, the same data splitting procedure is carried out with respect to the third level nodes $N'_{111}$ and $N'_{112}$, with the mean splits for those two nodes respectively being illustrated in parts (c) and (d) of FIG. 4. Again, in the case of each node, a determinant plane is established at a position bisecting, and in an orientation orthogonal to, the line segment defined by the respective centroids of the two classes of data vectors assigned to the respective node. As to the resulting fourth level of nodes, the left-side child node of $N'_{111}$ (namely, $N'_{1111}$) is "pure", having only "target" data vectors assigned thereto, and is therefore a terminal node having a confidence factor parameter 1. Each of the other resulting fourth level nodes is not "pure" so that further data-splitting operations are carried out with respect thereto. Although not explicitly shown, it should be understood that the recursive data splitting process continues until a predetermined terminal level (say, the sixth or eighth level) of the tree structure is reached. It will also be understood from the previous discussion of confidence factors that each "impure" node at the terminal level has a confidence factor (not equal to either 0 or 1), equal to the proportion of data vectors assigned to the node which are of the target class.

As indicated above, determinant parameters, and terminal node confidence factors, are determined to provide decision trees for each of the target words. This processing is preferably carried out using the same training data for each decision tree, albeit with appropriate variations in the label data, so that for each decision tree only the data vectors corresponding to the target word for that tree are labelled "1". Upon completion of this processing, the resulting parameters are stored in the memory 20. At this point the training of the system 10 is complete, and recognition of unknown (sometimes referred to as "test") utterances may be carried out.

Word Recognition Processing

Figure 6:
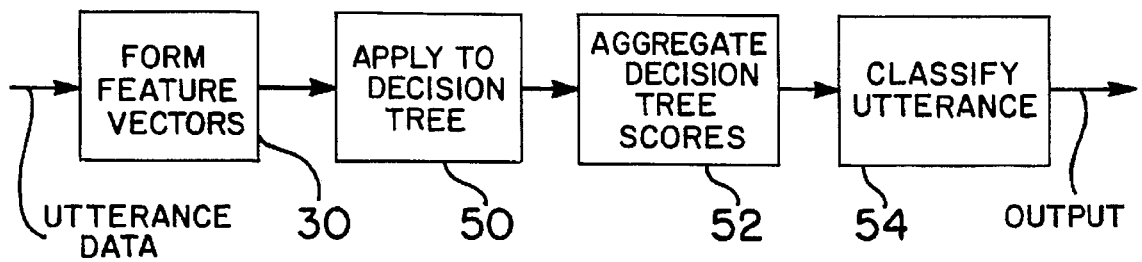
FIG. 6 is a functional block diagram which illustrates classification of unknown spoken utterances by use of decision tree classifier algorithms in accordance with the invention.
Figure 7:
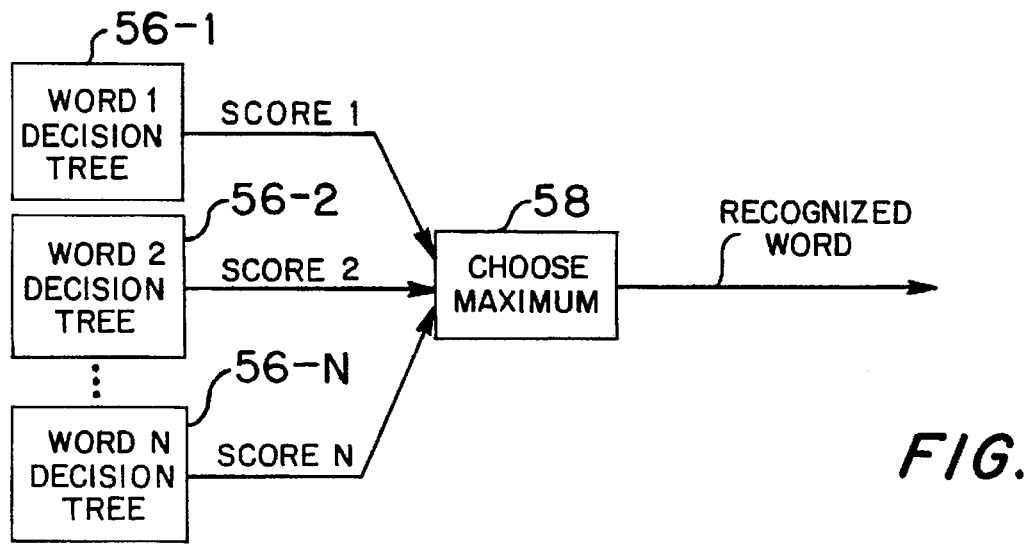
FIG. 7 illustrates an utterance classification function that is part of the processing illustrated in FIG. 6.

It will be appreciated that an utterance to be recognized is received at the microphone 14 and converted into a sequence of digital signal samples at the A/D converter 16. The processing carried out at the processor 18 with respect to the resulting digital signal samples is illustrated in functional block form in FIG. 6. Initially, the digital signal samples are formed into time-index-augmented feature vectors by the same processing that was discussed in connection with block 30 of FIG. 2. Continuing to refer to FIG. 6, each one of the augmented feature vectors is applied for classification to each one of the decision trees (block 50). As a result, in the case of each one of the decision trees, every one of the augmented feature vectors is classified at the root node of the respective decision tree for assignment to one of the second level nodes, and each vector is assigned, from node to node, downwardly through the decision tree structure according to the determinant at each node, until the feature vector is assigned to a terminal node of the decision tree, at which point the confidence factor at that node (0, 1, or a value in between) is assigned to the decision vector as a "score" from the respective decision tree. All of the scores assigned to the vectors by each respective decision tree are then aggregated (block 52) and then the utterance is classified (block 54) as one of the target words on the basis of the respective aggregate scores for each target word decision tree. In particular, as illustrated in FIG. 7, an aggregate score is formed at each of the decision trees 56-1 to 56-N and the largest of the aggregate scores is selected as being indicative of the target word which corresponds to the testing utterance (block 58). A suitable output representative of the recognized word is then provided to the output device 23 (FIG. 1). Although not shown in FIG. 7, it is also contemplated to compare the maximum aggregate score with a threshold, and to provide no output, or an output indicating that the testing utterance is not recognized as one of the target words, if the maximum aggregate score falls short of the threshold.

Those who are skilled in the art will recognize that the above-described technique of applying binary decision tree classifiers to time-indexed feature vectors is relatively simple and computationally very efficient, as well as being suitable for implementation on fixed-point processing platforms. But what is particularly notable about the above-described technique is that it provides performance that is comparable to much more complex, and computationally more demanding, hidden Markov model approaches, which the prior art appears to have regarded as necessary for high performance. In an experimental application of the above-described hyper-plane decision-tree/time-index-augmented-feature-vector technique, the digit portion of the Texas Instruments 46-word data base was used. An eight level decision tree was trained for each one of the digits ("zero"–"nine"). Three tests were performed. The first test consisted only of male speakers for training and testing. The second test consisted only of female speakers for training and testing. In the third test both male and female speakers were used. During the training portion of the test, about 80 utterances of each digit, by each of male and female speakers were utilized. During the recognition portion, 125 utterances of each digit by male and female speakers, respectively, were utilized. For purposes of comparison, the digit utterances were also evaluated with a hidden Markov model having 8 states per model. A comparison of the results is summarized in Table 1.

TABLE 1

| Data Set | HMM | Decision Tree |
|---|---|---|
| Male | 99.4% | 99.5% |
| Female | 99.6% | 99.8% |
| Both | 97.8% | 99.2% |

It will be recognized from the table that the performance of the decision tree procedure carried out in accordance with the invention was comparable to that of the hidden Markov model. It is estimated that the computational requirement for the decision tree procedure is about an order of magnitude less than that for the hidden Markov model, during the recognition phase of the experiment. This advantage in computing efficiency is of particular value in real-time implementations.

Computationally Efficient Training Techniques

Another aspect of the invention is directed to providing efficiency during the decision tree training procedure represented by block 32 in FIG. 2. According to this aspect of the invention, each one of the training data feature vectors is assigned an index indicative of the sub-node to which the data vector is assigned, and the assigned index data is stored in the memory in association with the data vector and is updated as the recursive data-splitting process of FIG. 5A is carried out. Further, the assignment of training data vectors to node precedes level by level down the tree, rather than completing a branch of the tree down to a terminal level and then backtracking.

More specifically, and referring once again to FIG. 5A, all of the training data vectors are initially assigned, of course, to the root node $N_1$. Then respective centroids (means) for the target and non-target classes of vectors are calculated, and the above-described mean-split partition is made, so that all of the data vectors on one side of the mean-split hyper plane are assigned to the node $N_{11}$ and the remaining data vectors are assigned to the node $N_{12}$. Node index data indicative of the sub-node to which the data vector has been assigned is stored in the memory 20 in association with each data vector. Then, for the purpose of calculating the two class centroids for each of the two sub-nodes, the processor 18 makes a single pass through the memory space according to a predetermined sequence of the memory locations in which the data vectors are stored. At each memory location, the processor 18 applies the data vector at that location to the appropriate one of the respective accumulations for the four centroids, on the basis of the label data and node index data stored for the data vector at that memory location. At the conclusion of that one pass through the memory space, the accumulations required for calculating all four of the means corresponding to the four centroids are complete. The mean-split assignment of the data vectors respectively assigned to the two second level nodes are then made and the node index data for the data vectors is updated to indicate the assignments of the data vectors among the four third level nodes. Then the eight accumulations required for the third level nodes are again carried out by a single pass through the memory space. This process continues level-by-level through the balance of the tree structure until the terminal level is reached.

By stream-lining the process of fetching the data required for the sub-node mean calculations, this technique significantly enhances the efficiency with which the training processing can be carried out.

Although the embodiments of the invention have heretofore been described as applying time-index-augmented feature vectors to decision tree classifiers, it is contemplated, as well, to apply such feature vectors to other types of pattern classifiers, such as neural networks, including single-layer or multi-layer perceptrons.

It is to be understood that the above description may indicate to those skilled in the art additional ways in which the principles of this invention may be used without departing from the spirit of the invention. The particularly preferred methods and apparatus are thus intended in an illustrative and not limiting sense. The true spirit and scope of the invention is set forth in the following claims.

What is claimed is:

1. A method of automatically recognizing isolated utterances, comprising the steps of:
   receiving an utterance to be recognized;
   converting the received utterance into a sequence of digital signal samples;
   forming from the sequence of digital signal samples a sequence of feature vectors each of which represents characteristics of the received utterance during a respective temporal portion of the utterance;
   augmenting each of the feature vectors with a time index representative of a position of the respective feature vector in the sequence of feature vectors; and
   classifying the augmented feature vectors by use of a pattern classifier algorithm.

2. A method according to claim 1, wherein said classifying step includes classifying the augmented feature vectors by use of each of a plurality of decision tree classifier algorithms, each one of said plurality of decision tree classifier algorithms corresponding to a respective one of a plurality of target words.

3. A method according to claim 2, wherein each of said plurality of decision tree classifier algorithms assigns a respective numerical score to each one of said augmented feature vectors, and further comprising the steps of:
   aggregating, with respect to each of said decision tree classifier algorithms, the numerical scores assigned to the augmented feature vectors by means of the respective decision tree classifier algorithm; and
   classifying the received utterance as the target word corresponding to the decision tree classifier algorithm which produced a largest one of the aggregated numerical scores.

4. A method of automatically recognizing isolated utterances, comprising the steps of:
   receiving an utterance to be recognized;
   converting the received utterance into a sequence of digital signal samples;
   forming from the sequence of digital signal samples a sequence of feature vectors each of which represents characteristics of the received utterance during a respective temporal portion of the utterance; and
   classifying the feature vectors by use of each of a plurality of decision tree classifier algorithms, each one of said plurality of decision tree classifier algorithms corresponding to a respective one of a plurality of target words.

5. A method according to claim 4, wherein each of said plurality of decision tree classifier algorithms assigns a respective numerical score to each one of said feature vectors, and said classifying step further includes:
   aggregating, with respect to each of said decision tree classifier algorithms, the numerical scores assigned to the feature vectors by means of the respective decision tree classifier algorithm; and
   classifying the received utterance as the target word corresponding to the decision tree classifier algorithm which produced a largest one of the aggregated numerical scores.

6. A method according to claim 4, wherein each of said plurality of decision tree classifier algorithms assigns a respective numerical score to each one of said feature vectors, and said classifying step further includes:
   aggregating, with respect to each of said decision tree classifier algorithms, the numerical scores assigned to the feature vectors by means of the respective decision tree classifier algorithm;
   comparing a largest one of the aggregated numerical scores to a predetermined threshold; and
   if said largest one of the aggregated numerical scores exceeds said threshold, classifying the received utterance as the target word corresponding to the decision tree classifier algorithm which produced said largest one of the aggregated numerical scores.

7. A method of training a processing device to perform a decision tree classifier algorithm, comprising the steps of:
   supplying a plurality of data vectors to said processing device, each of said data vectors consisting of n elements, n being a positive integer;
   inputting to the processing device, with each of said data vectors, a respective binary label indicative of whether or not the data vector is representative of a target class of data vectors to be recognized by the classifier algorithm;
   calculating a first centroid vector as the average of the data vectors representative of the target class;
   calculating a second centroid vector as the average of the data vectors not representative of the target class;
   assigning to a right-side child node all of said data vectors that are closer in n-dimensional space to said first centroid vector than to said second centroid vector;

assigning to a left-side child node all of said data vectors that are not assigned to said right-side child node; and applying the following steps recursively with respect to each of said nodes:

determining whether said node satisfies a termination criterion;

if said node is not determined to satisfy the termination criterion, calculating a first node centroid vector as the average of the data vectors assigned to said node and representative of the target class, calculating a second node centroid vector as the average of the data vectors assigned to said node and not representative of the target class, assigning to a right-side sub-node all of the data vectors assigned to said node that are closer in n-dimensional space to said first node centroid vector than to said second node centroid vector, and assigning to a left-side sub-node all of the data vectors not assigned to said right-side sub-node.

8. A method according to claim 7, wherein each node is determined to satisfy a termination criterion if all data vectors assigned to such node are representative of the target class, or if all data vectors assigned to such node are not representative of the target class.

9. A method according to claim 8, wherein each node is determined to satisfy a termination criterion if such node is at a predetermined level of a tree structure defined for said classifier algorithm.

10. A method of training a processing device to perform a decision tree classifier algorithm, said training being carried out using a set of training data vectors stored in a memory, said decision tree classifier algorithm being formed in terms of a tree structure comprising a plurality of non-terminal nodes and a plurality of terminal nodes, each of said non-terminal nodes having a plurality of child nodes associated therewith, the method comprising the steps of:

assigning a respective plurality of said training data vectors to each one of said non-terminal nodes;

sub-assigning each of the respective plurality of training data vectors among the child nodes associated with the non-terminal node to which the respective plurality of vectors was assigned; and in association with each one of the respective plurality of training data vectors, storing in the memory sub-assignment data indicative of the child node to which said each training data vector was sub-assigned.

11. A method according to claim 10, wherein said tree structure has a first level consisting of a root node which is not a child node of any other node, a second level consisting of the child nodes of said root node, and a third level consisting of the child nodes of the nodes which constitute said second level, and said assigning and sub-assigning steps are carried out so that, with respect to each one of said levels, each one of the stored data vectors is assigned among the nodes of the respective level before any one of the data vectors is sub-assigned to a child node of a node of the respective level.

12. A method according to claim 10, wherein each non-terminal node has exactly two child nodes.

13. Apparatus for automatically recognizing isolated utterances, comprising:

means for receiving an utterance to be recognized;

means for converting the received utterance into a sequence of digital signal samples; and a processor programmed to:

form from the sequence of digital signal samples a sequence of feature vectors each of which represents characteristics of the received utterance during a respective temporal portion of the utterance;

augment each of the feature vectors with a time index representative of a position of the respective feature vector in the sequence of feature vectors; and classify the augmented feature vectors by use of a pattern classifier algorithm.

14. Apparatus according to claim 13, wherein said processor classifies the augmented feature vectors by use of each of a plurality of decision tree classifier algorithms, each one of said plurality of decision tree classifier algorithms corresponding to a respective one of a plurality of target words.

15. Apparatus according to claim 14, wherein said processor uses each of said plurality of decision tree classifier algorithms to assign a respective numerical score to each one of said augmented feature vectors, and said processor is further programmed to:

aggregate, with respect to each of said decision tree classifier algorithms, the numerical scores assigned to the augmented feature vectors by means of the respective decision tree classifier algorithm; and classify the received utterance as the target word corresponding to the decision tree classifier algorithm which produced a largest one of the aggregated numerical scores.

* * * * *

UNITED STATES PATENT AND TRADEMARK OFFICE
CERTIFICATE OF CORRECTION

PATENT NO. : 5,657,424

DATED : August 12, 1997

INVENTOR(S) : Farrell et al.

It is certified that error appears in the above-identified patent and that said Letters Patent is hereby corrected as shown below:

Title Page, Item [56] References Cited, Other Publications, line 5, delete "Seleced" and insert -- Selected --.

Signed and Sealed this

Seventeenth Day of March, 1998

Attest:

BRUCE LEHMAN

Attesting Officer     Commissioner of Patents and Trademarks